US010567807B1

(12) United States Patent
Xu et al.

(10) Patent No.: US 10,567,807 B1
(45) Date of Patent: Feb. 18, 2020

(54) ADJUSTABLE PER-SYMBOL ENTROPY CODING PROBABILITY UPDATING FOR IMAGE AND VIDEO CODING

(71) Applicant: GOOGLE LLC, Mountain View, CA (US)

(72) Inventors: Yaowu Xu, Saratoga, CA (US); Hui Su, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/266,486

(22) Filed: Feb. 4, 2019

(51) Int. Cl.
H04N 19/00 (2014.01)
H04N 19/91 (2014.01)
H04N 19/184 (2014.01)
G06F 17/18 (2006.01)
H04N 19/172 (2014.01)
H04N 19/177 (2014.01)
H04N 19/176 (2014.01)

(52) U.S. Cl.
CPC ............ H04N 19/91 (2014.11); G06F 17/18 (2013.01); H04N 19/172 (2014.11); H04N 19/176 (2014.11); H04N 19/177 (2014.11); H04N 19/184 (2014.11)

(58) Field of Classification Search
CPC .... H04N 19/91; H04N 19/172; H04N 19/176; H04N 19/177; H04N 19/184; G06F 17/18
See application file for complete search history.

(56) References Cited

U.S. PATENT DOCUMENTS

2007/0046504 A1* 3/2007 Ridge ................. H04N 19/176
341/50
2012/0243605 A1* 9/2012 Turlikov ................ H04N 19/13
375/240.03
2014/0327737 A1* 11/2014 Westwater ........... H04N 19/129
348/43

(Continued)

OTHER PUBLICATIONS

Bankoski, et al., "Technical Overview of VP8, an Open Source Video Codec for the Web", Jul. 11, 2011, 6 pp.

(Continued)

Primary Examiner — Zhihan Zhou
(74) Attorney, Agent, or Firm — Young Basile Hanlon & MacFarlane, P.C.

(57) ABSTRACT

Decoding encoded image data using adjustable per-symbol entropy coding probability updating may include identifying a probability update indicator indicating whether per-symbol entropy coding probability updating is enabled, identifying current entropy coding probabilities, identifying a current entropy coded representation of a current symbol, generating the current symbol by entropy decoding the current entropy coded representation of the current symbol based on the current entropy coding probabilities, in response to a determination that the probability update indicator indicates that per-symbol entropy coding probability updating is enabled for the current portion, generating updated entropy coding probabilities based on the current symbol and the current entropy coding probabilities, generating a decoded current portion using the current symbol, including the decoded current portion in the decoded image data, and outputting the decoded image data.

20 Claims, 8 Drawing Sheets

(56) References Cited

U.S. PATENT DOCUMENTS

2017/0250707 A1* 8/2017 Willner .............. H03M 7/4031

OTHER PUBLICATIONS

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

* cited by examiner

ADJUSTABLE PER-SYMBOL ENTROPY CODING PROBABILITY UPDATING FOR IMAGE AND VIDEO CODING

BACKGROUND

Digital images and video can be used, for example, on the internet, for remote business meetings via video conferencing, high definition video entertainment, video advertisements, or sharing of user-generated content. Due to the large amount of data involved in transferring and processing image and video data, high-performance compression may be advantageous for transmission and storage. Accordingly, it would be advantageous to provide high-resolution image and video transmitted over communications channels having limited bandwidth, such as image and video coding using adjustable per-symbol entropy coding probability updating.

SUMMARY

This application relates to encoding and decoding of image data, video stream data, or both for transmission or storage. Disclosed herein are aspects of systems, methods, and apparatuses for encoding and decoding using adjustable per-symbol entropy coding probability updating.

An aspect is a method for image coding comprising generating, by a processor, an encoded video stream by encoding an input video stream using adjustable per-symbol entropy coding probability updating. Encoding the input video stream using adjustable per-symbol entropy coding probability updating includes identifying a current portion of the input video stream, including a probability update indicator in an output bitstream, the probability update indicator indicating whether per-symbol entropy coding probability updating is enabled for the current portion, identifying current entropy coding probabilities for encoding the current portion, and identifying a current symbol from the current portion, generating an entropy coded representation of the current symbol based on the current entropy coding probabilities. Encoding the input video stream using adjustable per-symbol entropy coding probability updating includes, in response to generating the entropy coded representation of the current symbol and in response to a determination that the probability update indicator indicates that per-symbol entropy coding probability updating is enabled for the current portion, generating updated entropy coding probabilities based on the current symbol and the current entropy coding probabilities, and identifying the updated entropy coding probabilities as the current entropy coding probabilities. Encoding the input video stream using adjustable per-symbol entropy coding probability updating includes, in response to generating the entropy coded representation of the current symbol and in response to a determination that the probability update indicator indicates that per-symbol entropy coding probability updating is disabled for the current portion, omitting generating updated entropy coding probabilities. Encoding the input video stream using adjustable per-symbol entropy coding probability updating includes including the entropy coded representation in the output bitstream and outputting the output bitstream.

Another aspect is a method for image coding comprising generating, by a processor, decoded image data by decoding encoded image data using adjustable per-symbol entropy coding probability updating. Decoding the encoded image data using adjustable per-symbol entropy coding probability updating includes identifying a current portion of the decoded video stream, identifying a probability update indicator for the current portion, the probability update indicator indicating whether per-symbol entropy coding probability updating is enabled for the current portion, identifying current entropy coding probabilities for decoding the current portion, identifying a current entropy coded representation of a current symbol from the current portion, and generating the current symbol by entropy decoding the current entropy coded representation of the current symbol based on the current entropy coding probabilities. Decoding the encoded image data using adjustable per-symbol entropy coding probability updating includes, in response to generating the current symbol and in response to a determination that the probability update indicator indicates that per-symbol entropy coding probability updating is enabled for the current portion, generating updated entropy coding probabilities based on the current symbol and the current entropy coding probabilities and identifying the updated entropy coding probabilities as the current entropy coding probabilities. Decoding the encoded image data using adjustable per-symbol entropy coding probability updating includes, in response to generating the current symbol and in response to a determination that the probability update indicator indicates that per-symbol entropy coding probability updating is disabled for the current portion, omitting generating updated entropy coding probabilities. Decoding the encoded image data using adjustable per-symbol entropy coding probability updating includes generating a decoded current portion using the current symbol, including the decoded current portion in the decoded image data, and outputting the decoded image data.

Another aspect is an apparatus for image coding comprising a processor configured to generate decoded image data by decoding encoded image data using adjustable per-symbol entropy coding probability updating. Decoding the encoded image data using adjustable per-symbol entropy coding probability updating includes identifying a current portion of the decoded video stream, identifying a probability update indicator for the current portion, the probability update indicator indicating whether per-symbol entropy coding probability updating is enabled for the current portion, identifying current entropy coding probabilities for decoding the current portion, identifying a current entropy coded representation of a current symbol from the current portion, and generating the current symbol by entropy decoding the current entropy coded representation of the current symbol based on the current entropy coding probabilities. Decoding the encoded image data using adjustable per-symbol entropy coding probability updating includes, in response to generating the current symbol and in response to a determination that the probability update indicator indicates that per-symbol entropy coding probability updating is enabled for the current portion, generating updated entropy coding probabilities based on the current symbol and the current entropy coding probabilities and identifying the updated entropy coding probabilities as the current entropy coding probabilities. Decoding the encoded image data using adjustable per-symbol entropy coding probability updating includes, in response to generating the current symbol and in response to a determination that the probability update indicator indicates that per-symbol entropy coding probability updating is disabled for the current portion, omitting generating updated entropy coding probabilities. Decoding the encoded image data using adjustable per-symbol entropy coding probability updating includes generating a decoded current portion using the current symbol, including the decoded current portion in the decoded image data, and outputting the decoded image data.

Another aspect is an apparatus for image coding comprising a processor configured to generate an encoded video stream by encoding an input video stream using adjustable per-symbol entropy coding probability updating. Encoding the input video stream using adjustable per-symbol entropy coding probability updating includes identifying a current portion of the input video stream, including a probability update indicator in an output bitstream, the probability update indicator indicating whether per-symbol entropy coding probability updating is enabled for the current portion, identifying current entropy coding probabilities for encoding the current portion, identifying a current symbol from the current portion, and generating an entropy coded representation of the current symbol based on the current entropy coding probabilities. Encoding the input video stream using adjustable per-symbol entropy coding probability updating includes, in response to generating the entropy coded representation of the current symbol and in response to a determination that the probability update indicator indicates that per-symbol entropy coding probability updating is enabled for the current portion, generating updated entropy coding probabilities based on the current symbol and the current entropy coding probabilities, and identifying the updated entropy coding probabilities as the current entropy coding probabilities. Encoding the input video stream using adjustable per-symbol entropy coding probability updating includes, in response to generating the entropy coded representation of the current symbol and in response to a determination that the probability update indicator indicates that per-symbol entropy coding probability updating is disabled for the current portion, omitting generating updated entropy coding probabilities. Encoding the input video stream using adjustable per-symbol entropy coding probability updating includes including the entropy coded representation in the output bitstream, and outputting the output bitstream.

Variations in these and other aspects will be described in additional detail hereafter.

BRIEF DESCRIPTION OF THE DRAWINGS

The description herein makes reference to the accompanying drawings wherein like reference numerals refer to like parts throughout the several views unless otherwise noted or otherwise clear from context.

DETAILED DESCRIPTION

Figure 1:
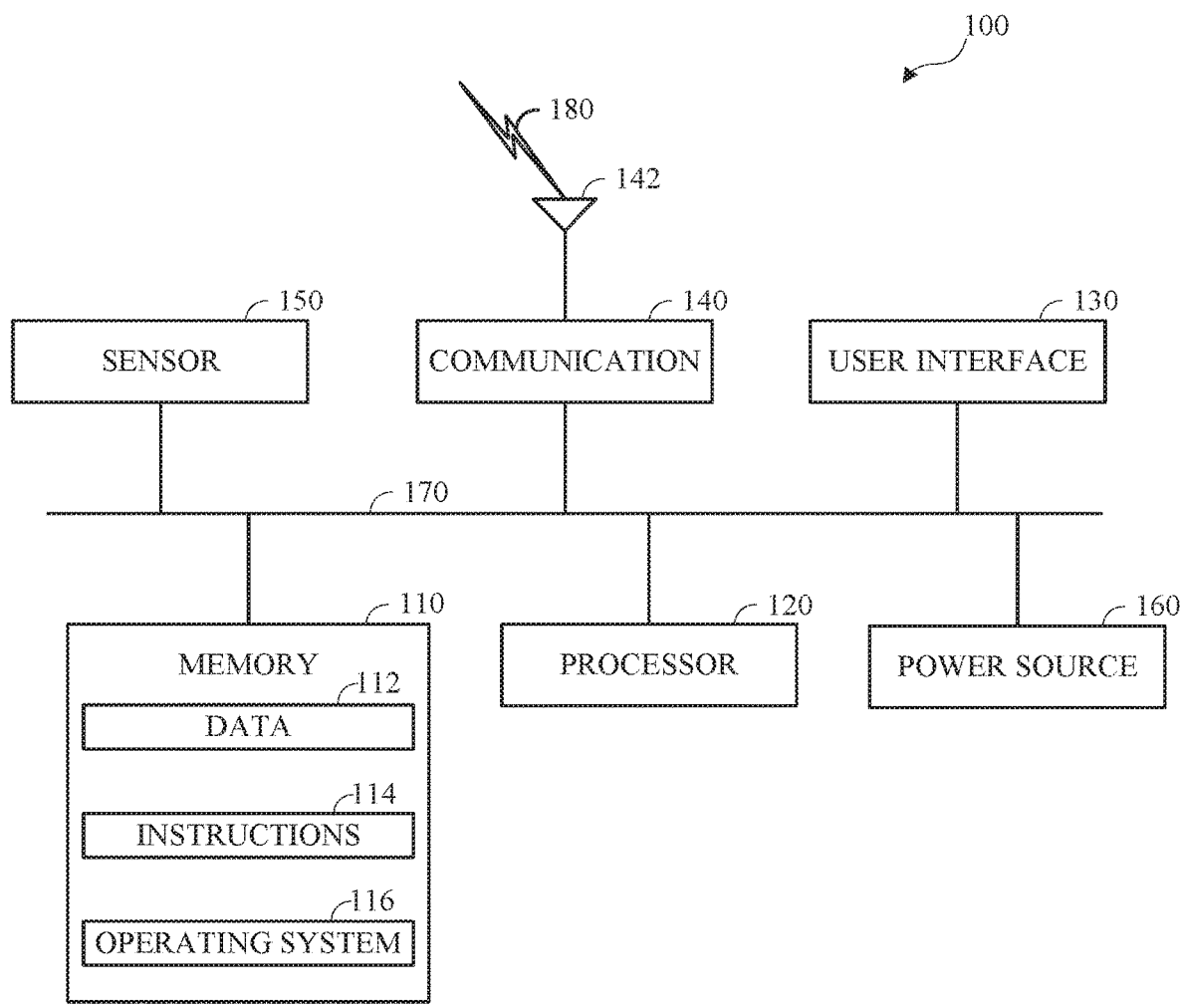
FIG. 1 is a diagram of a computing device in accordance with implementations of this disclosure.

Image and video compression schemes may include breaking an image, or frame, into smaller portions, such as blocks, and generating an output bitstream using techniques to minimize the bandwidth utilization of the information included for each block in the output. In some implementations, the information included for each block in the output may be limited by reducing spatial redundancy, reducing temporal redundancy, or a combination thereof. For example, temporal or spatial redundancies may be reduced by predicting a frame, or a portion thereof, based on information available to both the encoder and decoder, and including information representing a difference, or residual, between the predicted frame and the original frame in the encoded bitstream. The residual information may be further compressed by transforming the residual information into transform coefficients, quantizing the transform coefficients, and entropy coding the quantized transform coefficients. Other coding information, such as motion information, may be included in the encoded bitstream, which may include transmitting differential information based on predictions of the encoding information, which may be entropy coded to further reduce the corresponding bandwidth utilization. An encoded bitstream can be decoded to recreate the blocks and the source images from the limited information.

The entropy coding may include representing symbols from an input data stream, such as a video stream, as codes, such as one or more bits in a defined sequence, in an encoded output data stream. The codes may be associated with the symbols based on estimated probabilities that the symbols will appear in the input data stream. The probabilities may be estimated so that the shortest codes having the fewest bits may be associated with the most frequent symbols; however, the symbol frequency in some input data, such as video or other multimedia data, may be non-stationary and may vary significantly over time, which may reduce the accuracy of the probabilities. To optimize entropy coding efficiency, the probabilities may be continuously adapted. For example, symbol counts may be updated, and probabilities may be calculated for each symbol coded. Updating the probabilities for each symbol may improve compression performance and may increase resource utilization, such as the utilization of processing resources, relative to static or less frequent probability updates and may be subject to error caused by noise in the input data stream. To maintain accurate probabilities and reduce noise error using fewer resources adjustable entropy coding probability updating may be used.

Adjustable per-symbol entropy coding probability updating may include signaling whether to perform per-symbol entropy coding updates for a current portion of the video stream, such as on a frame basis, or on a block basis and enabling, or disabling, per-symbol entropy coding probability updates accordingly. Adjustable entropy coding probability updating may improve coding performance and resource management efficiency by increasing the available coding configurations for balancing compression efficiency and coding complexity. For example, enabling entropy coding probability updating may increase compression efficiency, which may reduce bandwidth utilization, and may increase coding complexity, which may increase processor utilization. In another example, disabling entropy coding probability updating may decrease compression efficiency, which may increase bandwidth utilization, and may decrease coding complexity, which may decrease processor utilization.

FIG. 1 is a diagram of a computing device 100 in accordance with implementations of this disclosure. The computing device 100 shown includes a memory 110, a processor 120, a user interface (UI) 130, an electronic communication unit 140, a sensor 150, a power source 160, and a bus 170. As used herein, the term "computing device" includes any unit, or a combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one element or elements of the computing device 100 can be integrated into any number of separate physical units. For example, the user interface 130 and processor 120 can be integrated in a first physical unit and the memory 110 can be integrated in a second physical unit.

The memory 110 can include any non-transitory computer-usable or computer-readable medium, such as any tangible device that can, for example, contain, store, communicate, or transport data 112, instructions 114, an operating system 116, or any information associated therewith, for use by or in connection with other components of the computing device 100. The non-transitory computer-usable or computer-readable medium can be, for example, a solid state drive, a memory card, removable media, a read-only memory (ROM), a random-access memory (RAM), any type of disk including a hard disk, a floppy disk, an optical disk, a magnetic or optical card, an application-specific integrated circuits (ASICs), or any type of non-transitory media suitable for storing electronic information, or any combination thereof.

Although shown a single unit, the memory 110 may include multiple physical units, such as one or more primary memory units, such as random-access memory units, one or more secondary data storage units, such as disks, or a combination thereof. For example, the data 112, or a portion thereof, the instructions 114, or a portion thereof, or both, may be stored in a secondary storage unit and may be loaded or otherwise transferred to a primary storage unit in conjunction with processing the respective data 112, executing the respective instructions 114, or both. In some implementations, the memory 110, or a portion thereof, may be removable memory.

The data 112 can include information, such as input audio data, encoded audio data, decoded audio data, or the like. The instructions 114 can include directions, such as code, for performing any method, or any portion or portions thereof, disclosed herein. The instructions 114 can be realized in hardware, software, or any combination thereof. For example, the instructions 114 may be implemented as information stored in the memory 110, such as a computer program, that may be executed by the processor 120 to perform any of the respective methods, algorithms, aspects, or combinations thereof, as described herein.

Although shown as included in the memory 110, in some implementations, the instructions 114, or a portion thereof, may be implemented as a special purpose processor, or circuitry, that can include specialized hardware for carrying out any of the methods, algorithms, aspects, or combinations thereof, as described herein. Portions of the instructions 114 can be distributed across multiple processors on the same machine or different machines or across a network such as a local area network, a wide area network, the Internet, or a combination thereof.

The processor 120 can include any device or system capable of manipulating or processing a digital signal or other electronic information now-existing or hereafter developed, including optical processors, quantum processors, molecular processors, or a combination thereof. For example, the processor 120 can include a special purpose processor, a central processing unit (CPU), a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors.

The user interface 130 can include any unit capable of interfacing with a user, such as a virtual or physical keypad, a touchpad, a display, a touch display, a speaker, a microphone, a video camera, a sensor, or any combination thereof. For example, the user interface 130 may be an audio-visual display device, and the computing device 100 may present audio, such as decoded audio, using the user interface 130 audio-visual display device, such as in conjunction with displaying video, such as decoded video. Although shown as a single unit, the user interface 130 may include one or more physical units. For example, the user interface 130 may include an audio interface for performing audio communication with a user, and a touch display for performing visual and touch-based communication with the user.

The electronic communication unit 140 can transmit, receive, or transmit and receive signals via a wired or wireless electronic communication medium 180, such as a radio frequency (RF) communication medium, an ultraviolet (UV) communication medium, a visible light communication medium, a fiber optic communication medium, a wireline communication medium, or a combination thereof. For example, as shown, the electronic communication unit 140 is operatively connected to an electronic communication interface 142, such as an antenna, configured to communicate via wireless signals.

Although the electronic communication interface 142 is shown as a wireless antenna in FIG. 1, the electronic communication interface 142 can be a wireless antenna, as shown, a wired communication port, such as an Ethernet port, an infrared port, a serial port, or any other wired or wireless unit capable of interfacing with a wired or wireless electronic communication medium 180. Although FIG. 1 shows a single electronic communication unit 140 and a single electronic communication interface 142, any number of electronic communication units and any number of electronic communication interfaces can be used.

The sensor 150 may include, for example, an audio-sensing device, a visible light-sensing device, a motion sensing device, or a combination thereof. For example, 100 the sensor 150 may include a sound-sensing device, such as a microphone, or any other sound-sensing device now existing or hereafter developed that can sense sounds in the proximity of the computing device 100, such as speech or other utterances, made by a user operating the computing device 100. In another example, the sensor 150 may include a camera, or any other image-sensing device now existing or hereafter developed that can sense an image such as the image of a user operating the computing device. Although a single sensor 150 is shown, the computing device 100 may include a number of sensors 150. For example, the computing device 100 may include a first camera oriented with a field of view directed toward a user of the computing device 100 and a second camera oriented with a field of view directed away from the user of the computing device 100.

The power source 160 can be any suitable device for powering the computing device 100. For example, the power source 160 can include a wired external power source interface; one or more dry cell batteries, such as nickel-cadmium (NiCd), nickel-zinc (NiZn), nickel metal hydride (NiMH), lithium-ion (Li-ion); solar cells; fuel cells; or any other device capable of powering the computing device 100. Although a single power source 160 is shown in FIG. 1, the computing device 100 may include multiple power sources 160, such as a battery and a wired external power source interface.

Although shown as separate units, the electronic communication unit 140, the electronic communication interface 142, the user interface 130, the power source 160, or portions thereof, may be configured as a combined unit. For example, the electronic communication unit 140, the electronic communication interface 142, the user interface 130, and the power source 160 may be implemented as a communications port capable of interfacing with an external display device, providing communications, power, or both.

One or more of the memory 110, the processor 120, the user interface 130, the electronic communication unit 140, the sensor 150, or the power source 160, may be operatively coupled via a bus 170. Although a single bus 170 is shown in FIG. 1, a computing device 100 may include multiple buses. For example, the memory 110, the processor 120, the user interface 130, the electronic communication unit 140, the sensor 150, and the bus 170 may receive power from the power source 160 via the bus 170. In another example, the memory 110, the processor 120, the user interface 130, the electronic communication unit 140, the sensor 150, the power source 160, or a combination thereof, may communicate data, such as by sending and receiving electronic signals, via the bus 170.

Although not shown separately in FIG. 1, one or more of the processor 120, the user interface 130, the electronic communication unit 140, the sensor 150, or the power source 160 may include internal memory, such as an internal buffer or register. For example, the processor 120 may include internal memory (not shown) and may read data 112 from the memory 110 into the internal memory (not shown) for processing.

Although shown as separate elements, the memory 110, the processor 120, the user interface 130, the electronic communication unit 140, the sensor 150, the power source 160, and the bus 170, or any combination thereof can be integrated in one or more electronic units, circuits, or chips.

Figure 2:
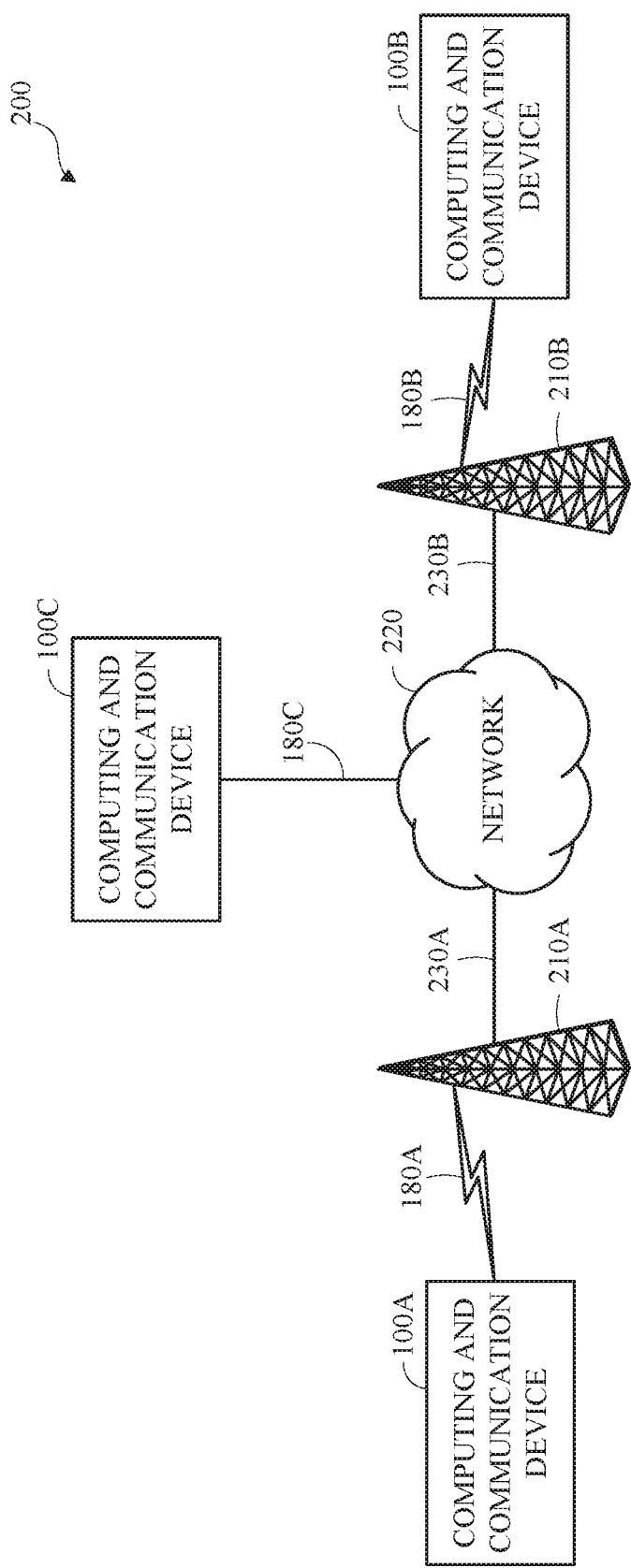
FIG. 2 is a diagram of a computing and communications system in accordance with implementations of this disclosure.

FIG. 2 is a diagram of a computing and communications system 200 in accordance with implementations of this disclosure. The computing and communications system 200 shown includes computing and communication devices 100A, 100B, 100C, access points 210A, 210B, and a network 220. For example, the computing and communication system 200 can be a multiple access system that provides communication, such as voice, audio, data, video, messaging, broadcast, or a combination thereof, to one or more wired or wireless communicating devices, such as the computing and communication devices 100A, 100B, 100C. Although, for simplicity, FIG. 2 shows three computing and communication devices 100A, 100B, 100C, two access points 210A, 210B, and one network 220, any number of computing and communication devices, access points, and networks can be used.

A computing and communication device 100A, 100B, 100C can be, for example, a computing device, such as the computing device 100 shown in FIG. 1. For example, the computing and communication devices 100A, 100B may be user devices, such as a mobile computing device, a laptop, a thin client, or a smartphone, and the computing and communication device 100C may be a server, such as a mainframe or a cluster. Although the computing and communication device 100A and the computing and communication device 100B are described as user devices, and the computing and communication device 100C is described as a server, any computing and communication device may perform some or all of the functions of a server, some or all of the functions of a user device, or some or all of the functions of a server and a user device. For example, the server computing and communication device 100C may receive, encode, process, store, transmit, or a combination thereof audio data and one or both of the computing and communication device 100A and the computing and communication device 100B may receive, decode, process, store, present, or a combination thereof the audio data.

Each computing and communication device 100A, 100B, 100C, which may include a user equipment (UE), a mobile station, a fixed or mobile subscriber unit, a cellular telephone, a personal computer, a tablet computer, a server, consumer electronics, or any similar device, can be configured to perform wired or wireless communication, such as via the network 220. For example, the computing and communication devices 100A, 100B, 100C can be configured to transmit or receive wired or wireless communication signals. Although each computing and communication device 100A, 100B, 100C is shown as a single unit, a computing and communication device can include any number of interconnected elements.

Each access point 210A, 210B can be any type of device configured to communicate with a computing and communication device 100A, 100B, 100C, a network 220, or both via wired or wireless communication links 180A, 180B, 180C. For example, an access point 210A, 210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A, 210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the HyperText Transport Protocol (HTTP), or a combination thereof.

The computing and communication devices 100A, 100B, 100C can communicate with each other via the network 220 using one or more a wired or wireless communication links, or via a combination of wired and wireless communication links. For example, as shown the computing and communication devices 100A, 100B can communicate via wireless communication links 180A, 180B, and computing and communication device 100C can communicate via a wired communication link 180C. Any of the computing and communication devices 100A, 100B, 100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A, 210B can communicate with the network 220 via one or more types of wired or wireless communication links 230A, 230B. Although FIG. 2 shows the computing and communication devices 100A, 100B, 100C in communication via the network 220, the computing and communication devices 100A, 100B, 100C can communicate with each other via any number of communication links, such as a direct wired or wireless communication link.

In some implementations, communications between one or more of the computing and communication device 100A, 100B, 100C may omit communicating via the network 220 and may include transferring data via another medium (not shown), such as a data storage device. For example, the server computing and communication device 100C may store audio data, such as encoded audio data, in a data storage device, such as a portable data storage unit, and one or both of the computing and communication device 100A or the computing and communication device 100B may access, read, or retrieve the stored audio data from the data storage unit, such as by physically disconnecting the data storage device from the server computing and communication device 100C and physically connecting the data storage device to the computing and communication device 100A or the computing and communication device 100B.

Other implementations of the computing and communications system 200 are possible. For example, in an implementation, the network 220 can be an ad-hoc network and can omit one or more of the access points 210A, 210B. The computing and communications system 200 may include devices, units, or elements not shown in FIG. 2. For example, the computing and communications system 200 may include many more communicating devices, networks, and access points.

Figure 3:
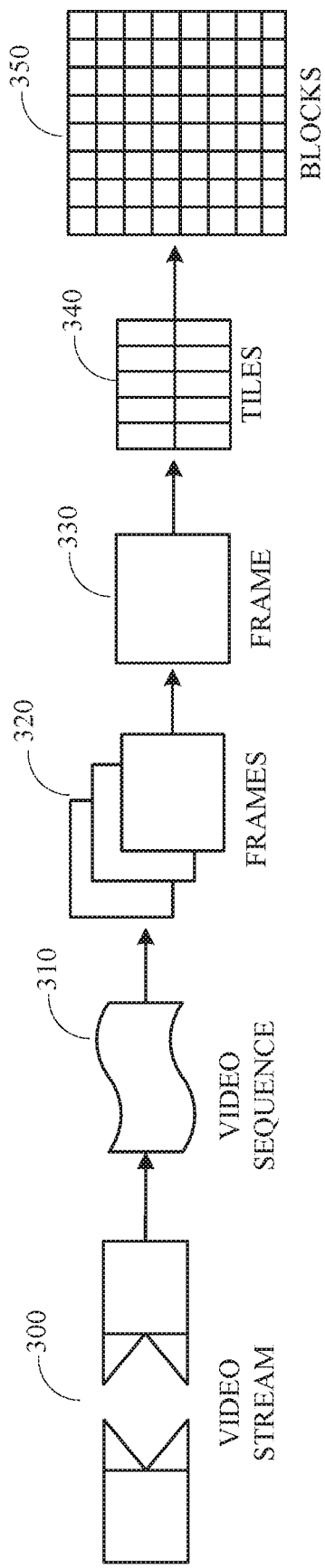
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320.

Each frame 330 from the adjacent frames 320 may represent a single image from the video stream. Although not shown in FIG. 3, a frame 330 may include one or more segments, tiles, or planes, which may be coded, or otherwise processed, independently, such as in parallel. A frame 330 may include one or more tiles 340. Each of the tiles 340 may be a rectangular region of the frame that can be coded independently. Each of the tiles 340 may include respective blocks 350. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
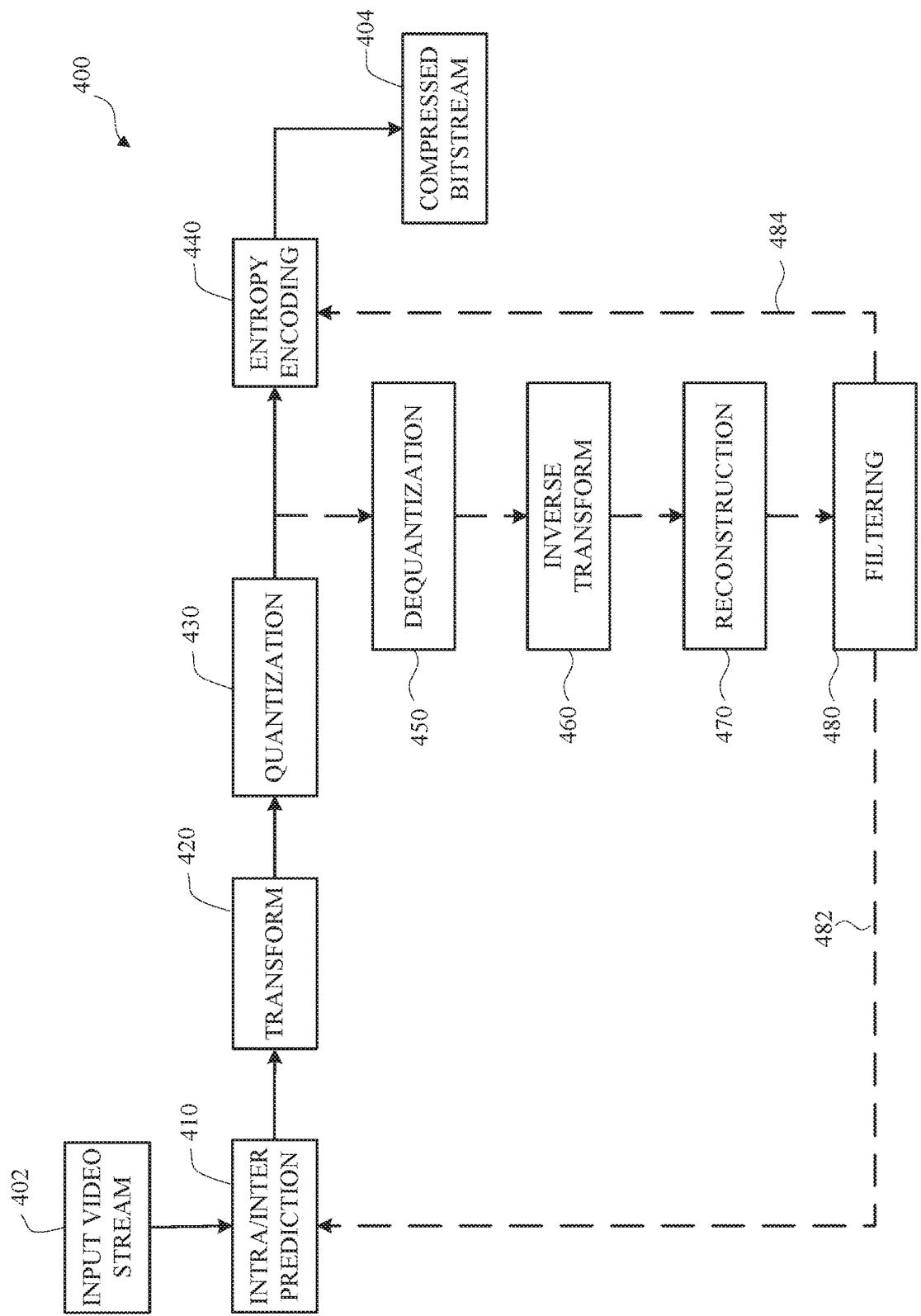
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3, to generate an encoded (compressed) bitstream 404. In some implementations, the encoder 400 may include a forward path for generating the compressed bitstream 404. The forward path may include an intra/inter prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference portion of the reference frame.

The intra/inter prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), the Singular Value Decomposition Transform (SVD), and the Asymmetric Discrete Sine Transform (ADST). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
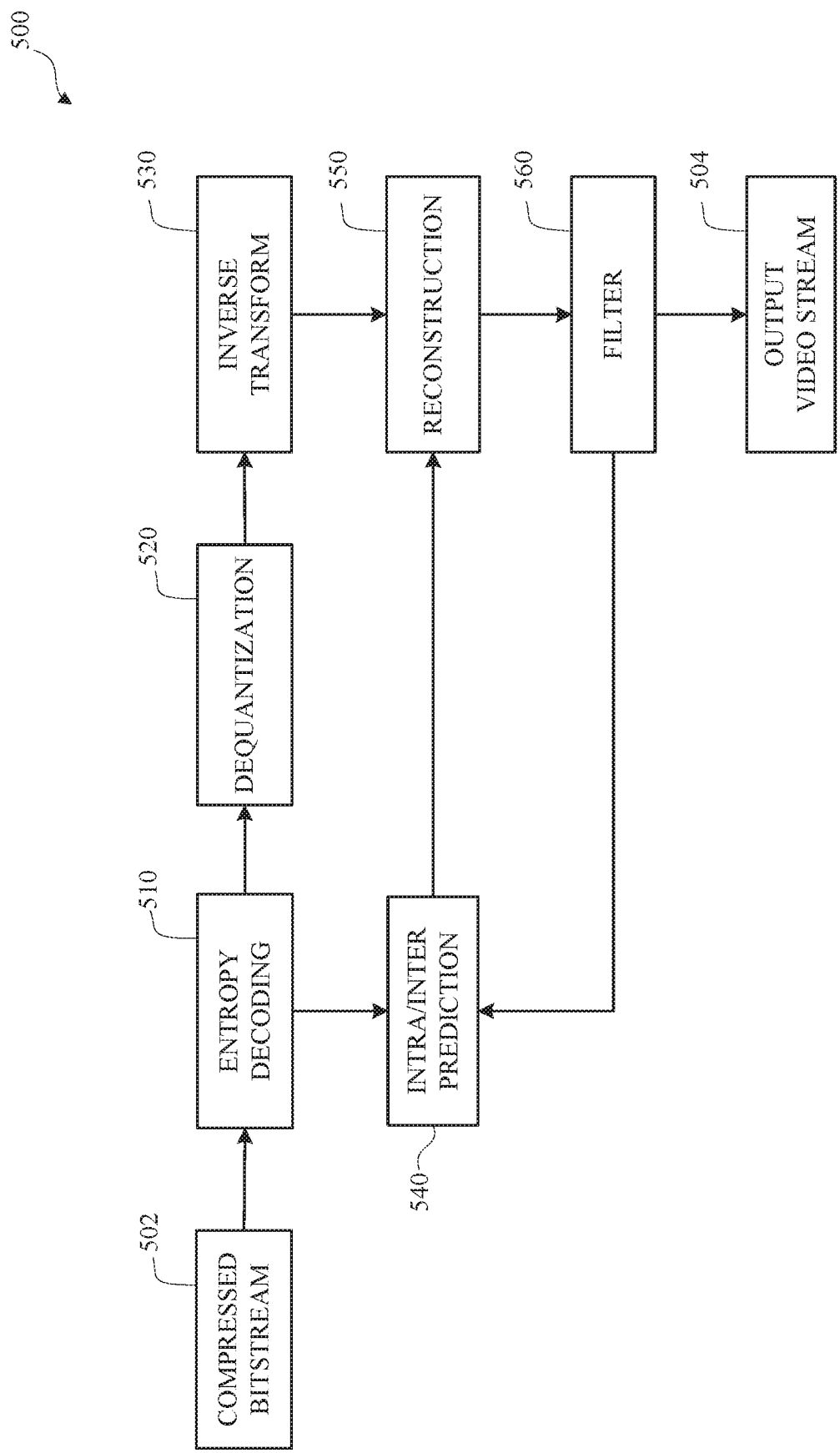
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below and may include decoding the encoded frame, or a portion thereof, which may include decoding an encoded block, which may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter prediction unit 410 to the derivative residual block to create a decoded block. The filtering unit 480 can be applied to the decoded block to generate a reconstructed block, which may reduce distortion, such as blocking artifacts. Although one filtering unit 480 is shown in FIG. 4, filtering the decoded block may include loop filtering, deblocking filtering, or other types of filtering or combinations of types of filtering. The reconstructed block may be stored or otherwise made accessible as a reconstructed block, which may be a portion of a reference frame, for encoding another portion of the current frame, another frame, or both, as indicated by the broken line at 482. Coding information, such as deblocking threshold index values, for the frame may be encoded, included in the compressed bitstream 404, or both, as indicated by the broken line at 484.

Other variations of the encoder 400 can be used to encode the compressed bitstream 404. For example, a non-transform-based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A, 100B, 100C shown in FIG. 2, as, for example, a computer software program stored in a data storage unit, such as the memory 110 shown in FIG. 1. The computer software program can include machine instructions that may be executed by a processor, such as the processor 120 shown in FIG. 1, and may cause the device to decode video data as described herein. The decoder 500 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter prediction unit 540, a reconstruction unit 550, a filtering unit 560, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond to the derivative residual block generated by the inverse transform unit 460 shown in FIG. 4. Using header information decoded from the compressed bitstream 502, the intra/inter prediction unit 540 may generate a prediction block corresponding to the prediction block created in the encoder 400. At the reconstruction unit 550, the prediction block can be added to the derivative residual block to create a decoded block. The filtering unit 560 can be applied to the decoded block to reduce artifacts, such as blocking artifacts, which may include loop filtering, deblocking filtering, or other types of filtering or combinations of types of filtering, and which may include generating a reconstructed block, which may be output as the output video stream 504.

Other variations of the decoder 500 can be used to decode the compressed bitstream 502. For example, the decoder 500 can produce the output video stream 504 without the deblocking filtering unit 570.

Figure 6:
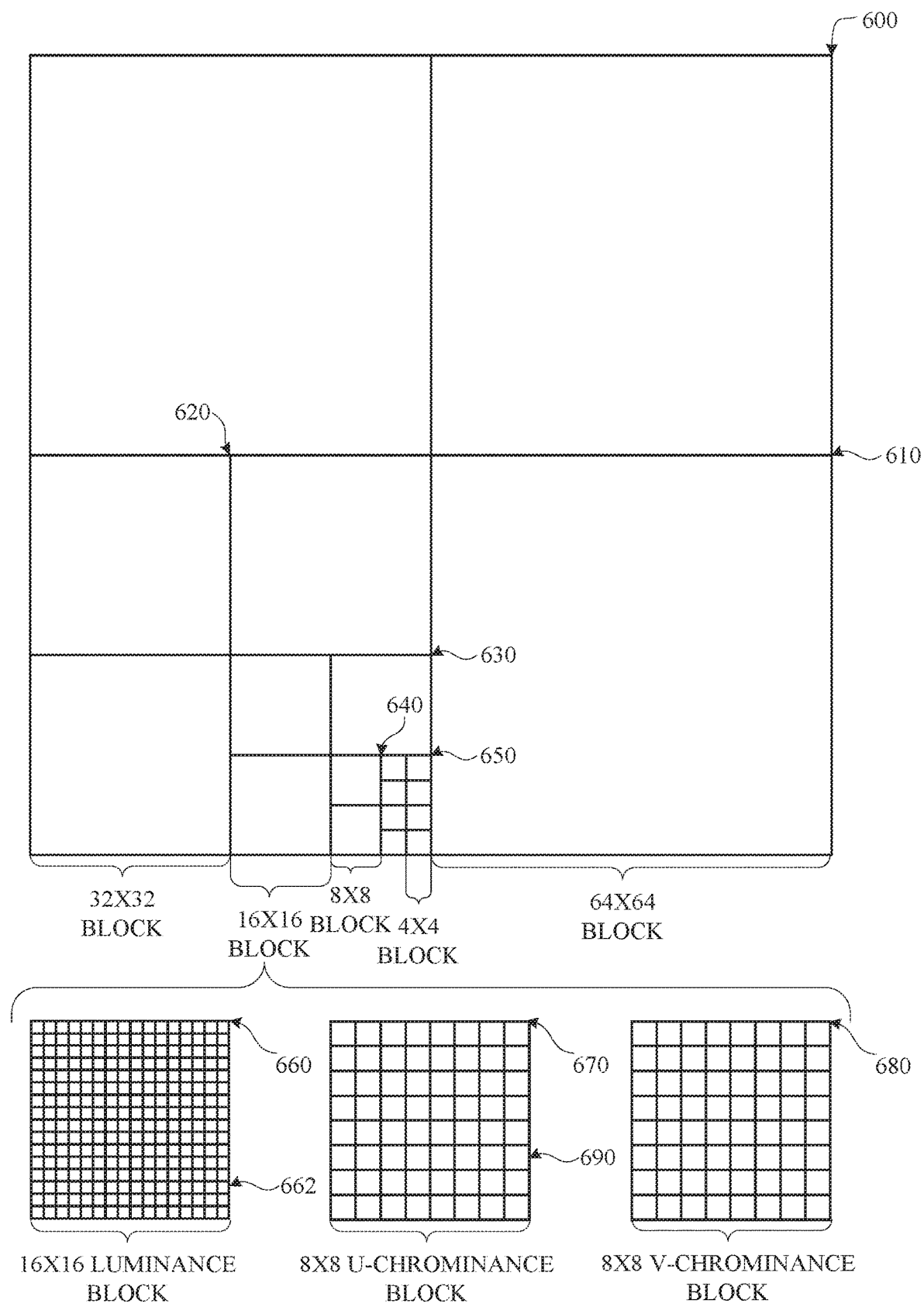
FIG. 6 is a block diagram of a representation of a portion of a frame in accordance with implementations of this disclosure.

FIG. 6 is a block diagram of a representation of a portion 600 of a frame, such as the frame 330 shown in FIG. 3, in accordance with implementations of this disclosure. As shown, the portion 600 of the frame includes four 64×64 blocks 610, in two rows and two columns in a matrix or Cartesian plane. In some implementations, a 64×64 block may be a maximum coding unit, N=64. Each 64×64 block may include four 32×32 blocks 620. Each 32×32 block may include four 16×16 blocks 630. Each 16×16 block may include four 8×8 blocks 640. Each 8×8 block 640 may include four 4×4 blocks 650. Each 4×4 block 650 may include 16 pixels, which may be represented in four rows and four columns in each respective block in the Cartesian plane or matrix. The pixels may include information representing an image captured in the frame, such as luminance information, color information, and location information. In some implementations, a block, such as a 16×16 pixel block as shown, may include a luminance block 660, which may include luminance pixels 662; and two chrominance blocks 670, 680, such as a U or Cb chrominance block 670, and a V or Cr chrominance block 680. The chrominance blocks 670, 680 may include chrominance pixels 690. For example, the luminance block 660 may include 16×16 luminance pixels 662 and each chrominance block 670, 680 may include 8×8 chrominance pixels 690 as shown. Although one arrangement of blocks is shown, any arrangement may be used. Although FIG. 6 shows N×N blocks, in some implementations, N×M blocks may be used. For example, 32×64 blocks, 64×32 blocks, 16×32 blocks, 32×16 blocks, or any other size blocks may be used. In some implementations, N×2N blocks, 2N×N blocks, or a combination thereof may be used.

In some implementations, video coding may include ordered block-level coding. Ordered block-level coding may include coding blocks of a frame in an order, such as raster-scan order, wherein blocks may be identified and processed starting with a block in the upper left corner of the frame, or portion of the frame, and proceeding along rows from left to right and from the top row to the bottom row, identifying each block in turn for processing. For example, the 64×64 block in the top row and left column of a frame may be the first block coded and the 64×64 block immediately to the right of the first block may be the second block coded. The second row from the top may be the second row coded, such that the 64×64 block in the left column of the second row may be coded after the 64×64 block in the rightmost column of the first row.

In some implementations, coding a block may include using quad-tree coding, which may include coding smaller block units within a block in raster-scan order. For example, the 64×64 block shown in the bottom left corner of the portion of the frame shown in FIG. 6, may be coded using quad-tree coding wherein the top left 32×32 block may be coded, then the top right 32×32 block may be coded, then the bottom left 32×32 block may be coded, and then the bottom right 32×32 block may be coded. Each 32×32 block may be coded using quad-tree coding wherein the top left 16×16 block may be coded, then the top right 16×16 block may be coded, then the bottom left 16×16 block may be coded, and then the bottom right 16×16 block may be coded. Each 16×16 block may be coded using quad-tree coding wherein the top left 8×8 block may be coded, then the top right 8×8 block may be coded, then the bottom left 8×8 block may be coded, and then the bottom right 8×8 block may be coded. Each 8×8 block may be coded using quad-tree coding wherein the top left 4×4 block may be coded, then the top right 4×4 block may be coded, then the bottom left 4×4 block may be coded, and then the bottom right 4×4 block may be coded. In some implementations, 8×8 blocks may be omitted for a 16×16 block, and the 16×16 block may be coded using quad-tree coding wherein the top left 4×4 block may be coded, then the other 4×4 blocks in the 16×16 block may be coded in raster-scan order.

In some implementations, video coding may include compressing the information included in an original, or input, frame by, for example, omitting some of the information in the original frame from a corresponding encoded frame. For example, coding may include reducing spectral redundancy, reducing spatial redundancy, reducing temporal redundancy, or a combination thereof.

In some implementations, reducing spectral redundancy may include using a color model based on a luminance component (Y) and two chrominance components (U and V or Cb and Cr), which may be referred to as the YUV or YCbCr color model, or color space. Using the YUV color model may include using a relatively large amount of information to represent the luminance component of a portion of a frame and using a relatively small amount of information to represent each corresponding chrominance component for the portion of the frame. For example, a portion of a frame may be represented by a high-resolution luminance component, which may include a 16×16 block of pixels, and by two lower resolution chrominance components, each of which represents the portion of the frame as an 8×8 block of pixels. A pixel may indicate a value, for example, a value in the range from 0 to 255, and may be stored or transmitted using, for example, eight bits. Although this disclosure is described in reference to the YUV color model, any color model may be used.

In some implementations, reducing spatial redundancy may include transforming a block into the frequency domain using, for example, a discrete cosine transform (DCT). For example, a unit of an encoder, such as the transform unit 420 shown in FIG. 4, may perform a DCT using transform coefficient values based on spatial frequency.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different spatial location and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a portion of a reference frame that corresponds to a current block or pixel of a current frame. For example, a reference frame, or a portion of a reference frame, which may be stored in memory, may be searched to identify a portion for generating a prediction to use for encoding a current block or pixel of the current frame with maximal efficiency. For example, the search may identify a portion of the reference frame for which the difference in pixel values between the current block and a prediction block generated based on the portion of the reference frame is minimized and may be referred to as motion searching. In some implementations, the portion of the reference frame searched may be limited. For example, the portion of the reference frame searched, which may be referred to as the search area, may include a limited number of rows of the reference frame. In an example, identifying the portion of the reference frame for generating a prediction may include calculating a cost function, such as a sum of absolute differences (SAD), between the pixels of portions of the search area and the pixels of the current block.

In some implementations, the spatial difference between the location of the portion of the reference frame for generating a prediction in the reference frame and the current block in the current frame may be represented as a motion vector. The difference in pixel values between the prediction block and the current block may be referred to as differential data, residual data, a prediction error, or as a residual block. In some implementations, generating motion vectors may be referred to as motion estimation, and a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

Although described herein with reference to matrix or Cartesian representation of a frame for clarity, a frame may be stored, transmitted, processed, or any combination thereof, in any data structure such that pixel values may be efficiently represented for a frame or image. For example, a frame may be stored, transmitted, processed, or any combination thereof, in a two-dimensional data structure such as a matrix as shown, or in a one-dimensional data structure, such as a vector array. In an implementation, a representation of the frame, such as a two-dimensional representation as shown, may correspond to a physical location in a rendering of the frame as an image. For example, a location in the top left corner of a block in the top left corner of the frame may correspond with a physical location in the top left corner of a rendering of the frame as an image.

In some implementations, block-based coding efficiency may be improved by partitioning input blocks into one or more prediction partitions, which may be rectangular, including square, partitions for prediction coding. In some implementations, video coding using prediction partitioning may include selecting a prediction partitioning scheme from among multiple candidate prediction partitioning schemes. For example, in some implementations, candidate prediction partitioning schemes for a 64×64 coding unit may include rectangular size prediction partitions ranging in sizes from 4×4 to 64×64, such as 4×4, 4×8, 8×4, 8×8, 8×16, 16×8, 16×16, 16×32, 32×16, 32×32, 32×64, 64×32, or 64×64. In some implementations, video coding using prediction partitioning may include a full prediction partition search, which may include selecting a prediction partitioning scheme by encoding the coding unit using each available candidate prediction partitioning scheme and selecting the best scheme, such as the scheme that produces the least rate-distortion error.

In some implementations, encoding a video frame may include identifying a prediction partitioning scheme for encoding a current block, such as block 610. In some implementations, identifying a prediction partitioning scheme may include determining whether to encode the block as a single prediction partition of maximum coding unit size, which may be 64×64 as shown, or to partition the block into multiple prediction partitions, which may correspond with the sub-blocks, such as the 32×32 blocks 620 the 16×16 blocks 630, or the 8×8 blocks 640, as shown, and may include determining whether to partition into one or more smaller prediction partitions. For example, a 64×64 block may be partitioned into four 32×32 prediction partitions. Three of the four 32×32 prediction partitions may be encoded as 32×32 prediction partitions and the fourth 32×32 prediction partition may be further partitioned into four 16×16 prediction partitions. Three of the four 16×16 prediction partitions may be encoded as 16×16 prediction partitions and the fourth 16×16 prediction partition may be further partitioned into four 8×8 prediction partitions, each of which may be encoded as an 8×8 prediction partition. In some implementations, identifying the prediction partitioning scheme may include using a prediction partitioning decision tree.

In some implementations, video coding for a current block may include identifying an optimal prediction coding mode from multiple candidate prediction coding modes, which may provide flexibility in handling video signals with various statistical properties and may improve the compression efficiency. For example, a video coder may evaluate each candidate prediction coding mode to identify the optimal prediction coding mode, which may be, for example, the prediction coding mode that minimizes an error metric, such as a rate-distortion cost, for the current block. In some implementations, the complexity of searching the candidate prediction coding modes may be reduced by limiting the set of available candidate prediction coding modes based on similarities between the current block and a corresponding prediction block. In some implementations, the complexity of searching each candidate prediction coding mode may be reduced by performing a directed refinement mode search. For example, metrics may be generated for a limited set of candidate block sizes, such as 16×16, 8×8, and 4×4, the error metric associated with each block size may be in descending order, and additional candidate block sizes, such as 4×8 and 8×4 block sizes, may be evaluated.

In some implementations, block-based coding efficiency may be improved by partitioning a current residual block into one or more transform partitions, which may be rectangular, including square, partitions for transform coding. In some implementations, video coding using transform partitioning may include selecting a uniform transform partitioning scheme. For example, a current residual block, such as block 610, may be a 64×64 block and may be transformed without partitioning using a 64×64 transform.

Although not expressly shown in FIG. 6, a residual block may be transform partitioned using a uniform transform partitioning scheme. For example, a 64×64 residual block may be transform partitioned using a uniform transform partitioning scheme including four 32×32 transform blocks, using a uniform transform partitioning scheme including sixteen 16×16 transform blocks, using a uniform transform partitioning scheme including sixty-four 8×8 transform blocks, or using a uniform transform partitioning scheme including 256 4×4 transform blocks.

In some implementations, video coding using transform partitioning may include identifying multiple transform block sizes for a residual block using multiform transform partition coding. In some implementations, multiform transform partition coding may include recursively determining whether to transform a current block using a current block size transform or by partitioning the current block and multiform transform partition coding each partition. For example, the bottom left block 610 shown in FIG. 6 may be a 64×64 residual block, and multiform transform partition coding may include determining whether to code the current 64×64 residual block using a 64×64 transform or to code the 64×64 residual block by partitioning the 64×64 residual block into partitions, such as four 32×32 blocks 620, and multiform transform partition coding each partition. In some implementations, determining whether to transform partition the current block may be based on comparing a cost for encoding the current block using a current block size transform to a sum of costs for encoding each partition using partition size transforms.

Figure 7:
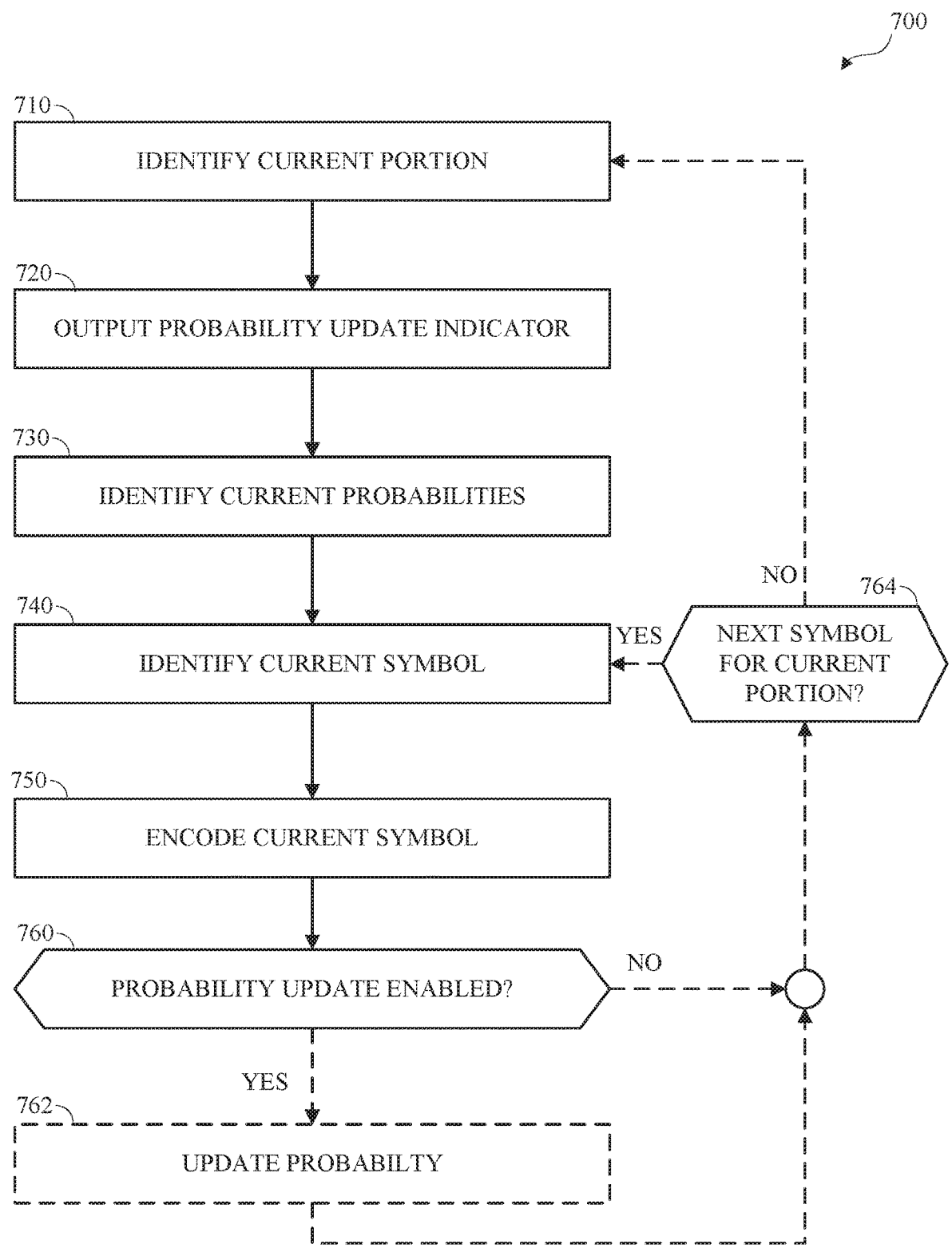
FIG. 7 is flowchart diagram of an example of encoding using adjustable per-symbol entropy coding probability updating in accordance with implementations of this disclosure.

FIG. 7 is flowchart diagram of an example of encoding using adjustable per-symbol entropy coding probability updating 700 in accordance with implementations of this disclosure. Encoding using adjustable per-symbol entropy coding probability updating 700 may be implemented in an encoder, such as the encoder 400 shown in FIG. 4.

Encoding using adjustable per-symbol entropy coding probability updating 700 may include identifying a current portion of a video stream at 710, outputting a current probability update indicator at 720, identifying current probabilities at 730, identifying a current symbol at 740, encoding the current symbol at 750, and determining whether a probability update is enabled at 760.

A current portion of a video stream is identified at 710. Identifying the current portion may include identifying a current input video sequence, such as the video sequence 310 shown in FIG. 3, from an input video stream, such as the input video stream 300 shown in FIG. 3 or the input video stream 402 shown in FIG. 4. Identifying the current portion may include identifying a current frame form the current input video sequence, such as the frame 330 shown in FIG. 3. In some implementations, the input video sequence may include a group of pictures (GOP), and identifying the current portion may include identifying a current group of pictures from the input video sequence and identifying the current frame from the current group of pictures. Identifying the current portion may include identifying a current tile, such as one of the tiles 340 shown in FIG. 3, from the current frame. Identifying the current portion may include identifying a current block, such as one of the blocks 350 shown in FIG. 3 or one of the blocks 600-650 shown in FIG. 6, from the current tile. Other portions of a video stream, such as a partition, a segment, or a region may be used.

A current probability update indicator is output at 720. The current probability update indicator indicates whether per-symbol probability updates are enabled for the video stream, or a current portion thereof. The current probability update indicator may be output as a bit or binary flag. A first value, such as zero or false, of the current probability update indicator may indicate that per-symbol probability updates are disabled for the video stream, or a current portion thereof. A second value, such as one or true, of the current probability update indicator may indicate that per-symbol probability updates are enabled for the video stream, or a current portion thereof.

The current probability update indicator may be output at 720 in a header for the current portion of the video stream identified at 710. For example, outputting the current probability update indicator may include including the current probability update indicator in a header for the input video stream. In another example, outputting the current probability update indicator may include including the current probability update indicator in a header for a current input video sequence. In another example, outputting the current probability update indicator may include including the current probability update indicator in a header for a current frame. In another example, outputting the current probability update indicator may include including the current probability update indicator in a header for a current group of pictures. In another example, outputting the current probability update indicator may include including the current probability update indicator in a header for a current tile. In another example, outputting the current probability update indicator may include including the current probability update indicator in a header for a current block. In another example, outputting the current probability update indicator may include including the current probability update indicator in a header for another portion of a video stream or frame, such as a partition, a segment, a group, or a region.

In some implementations, the current probability update indicator may indicate whether per-symbol probability updates are disabled for the video stream, or a current portion thereof. A first value, such as zero or false, of the current probability update indicator may indicate that per-symbol probability updates are enabled for the video stream, or a current portion thereof. A second value, such as one or true, of the current probability update indicator may indicate that per-symbol probability updates are disabled for the video stream, or a current portion thereof.

In some implementations, outputting the current probability update indicator at 720 may include outputting multiple type specific current probability update indicators, each type specific current probability update indicator indicating whether per-symbol probability updates are enabled, or disabled, for a respective type or class of data. For example, a coefficient current probability update indicator may indicate whether per-symbol probability updates are enabled, or disabled, for coding quantized transform coefficients and a motion vector current probability update indicator may indicate whether per-symbol probability updates are enabled, or disabled, for coding motion vectors. Determining whether probability updates are enabled at 760 and updating probabilities at 762 may be performed for each respective type or class of data.

In some implementations, outputting the current probability update indicator at 720 may be omitted and a previously identified probability update indicator may be identified as the current probability update indicator.

Although not shown separately in FIG. 7, encoding using adjustable per-symbol entropy coding probability updating 700 may include prediction coding, such as the prediction coding shown at 410 in FIG. 4, transformation, such as the transformation shown at 420 in FIG. 4, and quantization, such as the quantization shown at 430 in FIG. 4.

Current entropy coding probabilities may be identified at 730 for entropy coding the current portion identified at 710. Entropy coding includes using probability models that model the distribution of values occurring in an encoded video bitstream. Using probability models based on a measured or estimated distribution of values reduces the cardinality or number of bits utilized to represent video data. The compression performance, corresponding to the effective cardinality of bits utilized to represent video data can be a function of the accuracy of the probability model, the number of bits over which the coding is performed, and the computational accuracy of fixed-point arithmetic used to perform the coding. Updating the entropy coding models after each symbol is coded (backwards adaptation) may improve compression performance relative to using fixed probabilities. In some implementations, the current probabilities for generating an encoded symbol may be identified at the encoder such that a decoder may identify equivalent probabilities for decoding the encoded symbol. The encoder and the decoder may synchronize probabilities. For example, per-symbol entropy coding probability updates may be enabled, and the current probabilities may be based on per-symbol backwards adaptation performed for a previously encoded symbol of the input data stream.

A current symbol may be identified at 740. The current symbol may be a symbol identified for encoding the current portion identified at 710, or a portion thereof. For example, the current portion identified at 710 may be a current input video sequence and identifying the current symbol may include identifying a current input frame, identifying a current block of the current input frame, and encoding the current block, which may include generating quantized transform coefficients, and the current symbol may be identified based on a quantized transform coefficient.

The current symbol may be entropy encoded at 750. Entropy coding the current symbol at 750 may include identifying a current entropy coding probability for entropy coding the current symbol based on the current entropy coding probabilities for the current portion. The current probability model or distribution for encoding the current symbol may be identified based on the characteristics of the current symbol, such as the type of data represented by the current symbol, the context for coding the current symbol, or a combination thereof. Entropy coding the current symbol at 750 may include generating an encoded symbol by encoding the current symbol based on the entropy coding probability identified at 740. Entropy coding the current symbol at 750 may include identifying an entropy coded value for representing the current symbol based on the probability distribution identified for the current symbol at 740. Entropy coding the current symbol at 750 may include outputting the entropy coded value representing the current symbol, such as by including the entropy coded value representing the current symbol in a compressed bitstream, such as the compressed bitstream 404 shown in FIG. 4.

In some implementations, such as implementations using arithmetic coding or asymmetric numeral system (ANS) coding, entropy coding the current symbol at 750 may include using less than one bit per symbol and entropy coding the current symbol at 750 may include maintaining entropy coding state information in accordance with the current symbol and the probability distribution identified for the current symbol. The entropy coded information representing the current symbol may be output in accordance with encoding the current symbol, or in accordance with encoding a subsequent symbol.

Whether per-symbol entropy coding probability updating is enabled may be determined at 760. For example, the current probability update indicator identified at 720 may indicate that per-symbol probability updates are enabled. In another example, the current probability update indicator identified at 720 may indicate that per-symbol probability updates are disabled.

Per-symbol entropy coding probability updates may be enabled, and updated entropy coding probabilities may be generated at 762 by updating the current entropy coding probabilities and using the updated entropy coding probabilities as the current entropy coding probabilities. For example, the current symbol may be "A", the probability of "A" may be increased, and the probabilities of other symbols may be decreased.

The entropy coding probabilities may be updated at 762 and whether to code a subsequent symbol for the current portion may be determined at 764. A subsequent symbol for the current portion may be unavailable for coding and encoding using adjustable per-symbol entropy coding probability updating 700 may be repeated for a subsequent portion. A subsequent symbol for the current portion may be available for coding, the subsequent symbol may be identified as the current symbol at 740, the current symbol may be encoded at 750 using the updated entropy coding probabilities generated at 762, determining whether a probability update is enabled may be performed at 760, and updating the probabilities may be performed at 762.

Per-symbol entropy coding probability updates may be disabled, updating the probabilities at 762 may be omitted (as indicated by the broken line boarder at 762), and whether to code a subsequent symbol for the current portion may be determined at 764. A subsequent symbol for the current portion may be unavailable for coding and encoding using adjustable per-symbol entropy coding probability updating 700 may be repeated for a subsequent portion. A subsequent symbol for the current portion may be available for coding, the subsequent symbol may be identified as the current symbol at 740, the current symbol may be encoded at 750 based on the current probabilities identified at 730, and determining whether a probability update is enabled may be performed at 760.

Other implementations of encoding using adjustable per-symbol entropy coding probability updating 700 are available. In some implementations, additional elements of adjustable entropy coding probability update encoding can be added, certain elements can be combined, and/or certain elements can be removed.

Figure 8:
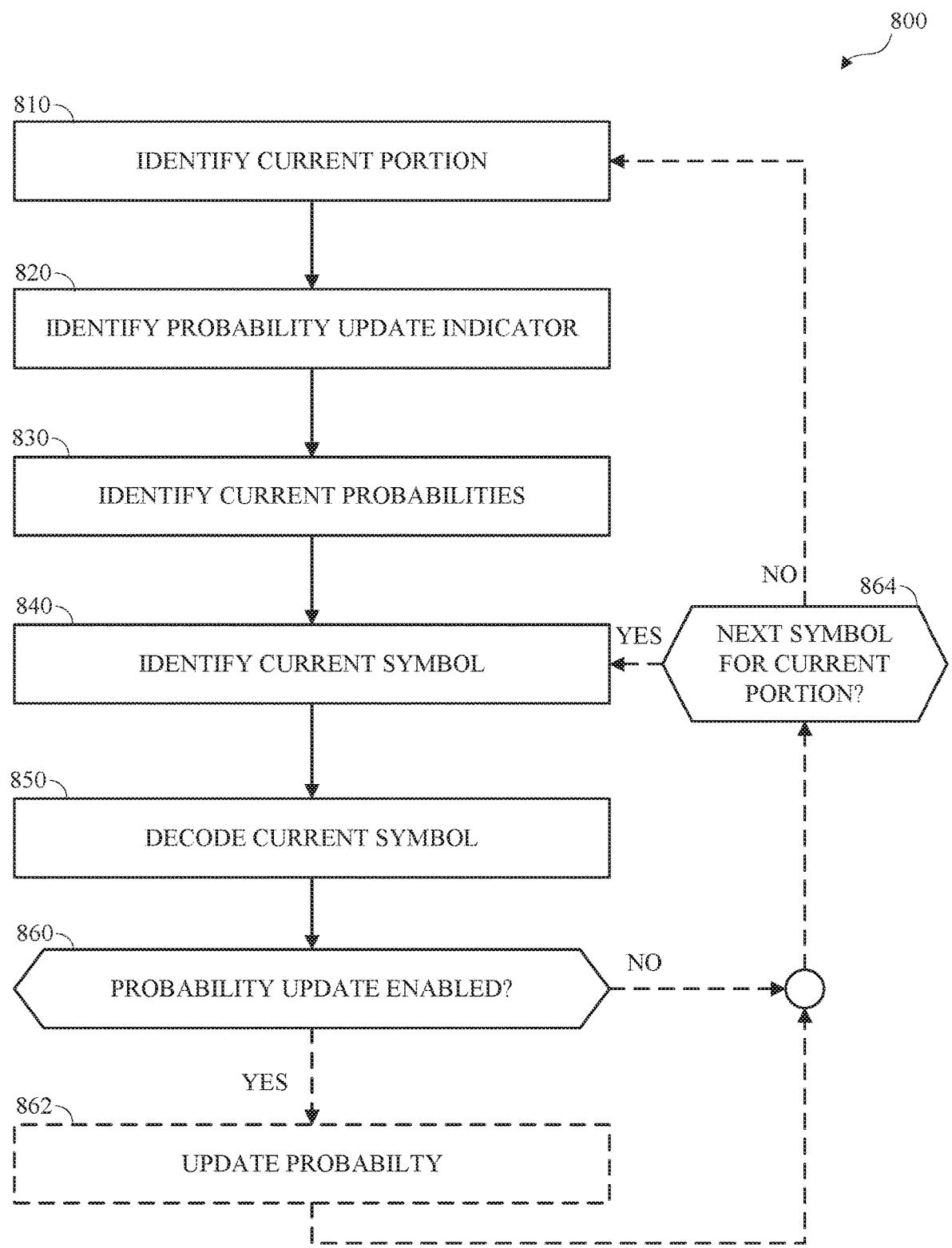
FIG. 8 is flowchart diagram of an example of decoding using adjustable per-symbol entropy coding probability updating in accordance with implementations of this disclosure.

FIG. 8 is flowchart diagram of an example of decoding using adjustable per-symbol entropy coding probability updating 800 in accordance with implementations of this disclosure. Decoding using adjustable per-symbol entropy coding probability updating 800 may be implemented in a decoder, such as the decoder 500 shown in FIG. 5. For example, an entropy decoding unit, such as the entropy decoding unit 510 shown in FIG. 5, may implement adjustable per-symbol entropy coding probability updating, or a portion thereof.

Decoding using adjustable per-symbol entropy coding probability updating 800 may include identifying a current portion of a video stream at 810, identifying a current probability update indicator at 820, identifying current probabilities at 830, identifying a current symbol at 840, decoding the current symbol at 850, and determining whether a probability update is enabled at 860.

A current portion of the video stream is identified at 810. The current portion of the video stream may be a current portion to be decoded for a decoded video stream. Identifying the current portion may include identifying a current encoded video sequence, such as the video sequence 310 shown in FIG. 3, from an encoded video stream, such as the compressed bitstream 502 shown in FIG. 5. Identifying the current portion may include identifying a current encoded frame form the current encoded video sequence, such as the frame 330 shown in FIG. 3. In some implementations, the encoded video sequence may include a group of pictures (GOP), and identifying the current portion may include identifying a current group of pictures from the encoded video sequence and identifying the current frame from the current group of pictures. Identifying the current portion may include identifying a current tile, such as one of the tiles 340 shown in FIG. 3, from the current frame. Identifying the current portion may include identifying a current block, such as one of the blocks 350 shown in FIG. 3 or one of the blocks 600-650 shown in FIG. 6, from the current tile. Other portions of a video stream, such as a partition, a segment, or a region may be used.

A current probability update indicator may be identified at 820. The current probability update indicator indicates whether per-symbol probability updates are enabled for the current portion identified at 810. For example, identifying the current portion at 810 may include reading or otherwise accessing a header for the current portion for the encoded bitstream and identifying the current probability update indicator may include reading the current probability update indicator from the header for the current portion. The current probability update indicator may be a bit or binary flag. A first value, such as zero or false, of the current probability update indicator may indicate that per-symbol probability updates are disabled for the current portion. A second value, such as one or true, of the current probability update indicator may indicate that per-symbol probability updates are enabled for the current portion.

For example, identifying the current probability update indicator may include reading the current probability update indicator from a header for the input video stream. In another example, identifying the current probability update indicator may include reading the current probability update indicator from a header for a current input video sequence. In another example, identifying the current probability update indicator may include reading the current probability update indicator from a header for a current frame. In another example, identifying the current probability update indicator may include reading the current probability update indicator from a header for a current group of pictures. In another example, identifying the current probability update indicator may include reading the current probability update indicator from a header for a current tile. In another example, identifying the current probability update indicator may include reading the current probability update indicator from a header for a current block. In another example, identifying the current probability update indicator may include reading the current probability update indicator from a header for another portion of a video stream or frame, such as a partition, a segment, a group, or a region, or otherwise reading the current probability update indicator from the encoded bitstream. In some implementations, identifying the current probability update indicator may omit reading the current probability update indicator from the encoded bitstream and may include using a defined value as the current probability update indicator.

In some implementations, the current probability update indicator may indicate whether per-symbol probability updates are disabled for the current portion. A first value, such as zero or false, of the current probability update indicator may indicate that per-symbol probability updates are enabled for the current portion. A second value, such as one or true, of the current probability update indicator may indicate that per-symbol probability updates are disabled for the current portion.

Current entropy coding probabilities may be identified at 830 for entropy coding the current portion identified at 810.

A current entropy coded symbol may be identified at 840. The current entropy coded symbol may be a symbol identified by reading or extracting the current entropy coded symbol from the encoded bitstream.

The current entropy coded symbol may be entropy decoded at 850. Entropy decoding the current entropy coded symbol at 850 may include identifying a current entropy coding probability for entropy decoding the current entropy coded symbol based on the current entropy coding probabilities for the current portion. The current entropy coding probability may be identified based on the type of data represented by the current symbol, the context for decoding the current symbol, or both. Entropy decoding the current entropy coded symbol at 850 may include generating a decoded symbol by decoding the current entropy coded symbol based on the entropy coding probability identified at 830. Entropy coding the current symbol at 850 may include outputting the entropy decoded current symbol, such as by including the entropy decoded current symbol in output video stream, such as the output video stream 504 shown in FIG. 5.

In some implementations, such as implementations using arithmetic coding or asymmetric numeral system coding, entropy decoding the current symbol at 850 may include using less than one bit per symbol and entropy decoding the current symbol at 850 may include maintaining entropy coding state information in accordance with the current symbol and the probability distribution identified for the current symbol. The current symbol may be output in accordance with decoding the current symbol, or in accordance with decoding a sequence of symbols.

Whether per-symbol entropy coding probability updating is enabled may be determined at 860. For example, the current probability update indicator identified at 820 may indicate that per-symbol probability updates are enabled. In another example, the current probability update indicator identified at 820 may indicate that per-symbol probability updates are disabled.

Per-symbol entropy coding probability updates may be enabled and updated entropy coding probabilities may be generated at 862 by updating the current entropy coding probabilities and using the updated entropy coding probabilities as the current entropy coding probabilities.

The entropy coding probabilities may be updated at 862 and whether to decode a subsequent symbol for the current portion may be determined at 864. A subsequent encoded symbol for the current portion may be unavailable for coding and decoding using adjustable per-symbol entropy coding probability updating 800 may be repeated for a subsequent portion. A subsequent encoded symbol for the current portion may be available for coding, the subsequent encoded symbol may be identified as the current encoded symbol at 840, the current encoded symbol may be decoded at 850 using the updated entropy coding probabilities generated at 862, determining whether a probability update is enabled may be performed at 860, and updating the probabilities may be performed at 862.

Per-symbol entropy coding probability updates may be disabled, updating the probabilities at 862 may be omitted (as indicated by the broken line boarder at 862), and whether to code a subsequent symbol for the current portion may be determined at 864. A subsequent encoded symbol for the current portion may be unavailable for coding and decoding using adjustable per-symbol entropy coding probability updating 800 may be repeated for a subsequent portion. A subsequent encoded symbol for the current portion may be available for coding, the subsequent encoded symbol may be identified as the current symbol at 840, the current symbol may be decoded at 850 based on the current probabilities identified at 830, and determining whether a probability update is enabled may be performed at 860.

Other implementations of decoding using adjustable per-symbol entropy coding probability updating 800 are available. In some implementations, additional elements of adjustable entropy coding probability update decoding can be added, certain elements can be combined, and/or certain elements can be removed.

As used herein, the terms "optimal", "optimized", "optimization", or other forms thereof, are relative to a respective context and are not indicative of absolute theoretic optimization unless expressly specified herein.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, one or more elements of the methods described herein may be omitted from implementations of methods in accordance with the disclosed subject matter.

The implementations of the transmitting computing and communication device 100A and/or the receiving computing and communication device 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting computing and communication device 100A and the receiving computing and communication device 100B do not necessarily have to be implemented in the same manner.

Further, in one implementation, for example, the transmitting computing and communication device 100A or the receiving computing and communication device 100B can be implemented using a computer program that, when executed, carries out any of the respective methods, algorithms and/or instructions described herein. In addition, or alternatively, for example, a special purpose computer/processor can be utilized which can contain specialized hardware for carrying out any of the methods, algorithms, or instructions described herein.

The transmitting computing and communication device 100A and receiving computing and communication device 100B can, for example, be implemented on computers in a real-time video system. Alternatively, the transmitting computing and communication device 100A can be implemented on a server and the receiving computing and communication device 100B can be implemented on a device separate from the server, such as a hand-held communications device. In this instance, the transmitting computing and communication device 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting computing and communication device 100A. Other suitable transmitting computing and communication device 100A and receiving computing and communication device 100B implementation schemes are available. For example, the receiving computing and communication device 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method comprising:
   generating, by a processor, an encoded video stream by encoding an input video stream using adjustable per-symbol entropy coding probability updating, wherein encoding the input video stream using adjustable per-symbol entropy coding probability updating includes:
   identifying a current portion of the input video stream;
   including a probability update indicator in an output bitstream, the probability update indicator indicating whether per-symbol entropy coding probability updating is enabled for the current portion;
   identifying current entropy coding probabilities for encoding the current portion;
   identifying a current symbol from the current portion;
   generating an entropy coded representation of the current symbol based on the current entropy coding probabilities;
   in response to generating the entropy coded representation of the current symbol:
   in response to a determination that the probability update indicator indicates that per-symbol entropy coding probability updating is enabled for the current portion:
   generating updated entropy coding probabilities based on the current symbol and the current entropy coding probabilities; and
   identifying the updated entropy coding probabilities as the current entropy coding probabilities;
   in response to a determination that the probability update indicator indicates that per-symbol entropy coding probability updating is disabled for the current portion, omitting generating updated entropy coding probabilities; and
   including the entropy coded representation in the output bitstream; and
   outputting the output bitstream.

2. The method of claim 1, wherein the probability update indicator is a binary flag.

3. The method of claim 1, wherein including the probability update indicator in the output bitstream includes including the probability update indicator in a header for the current portion.

4. The method of claim 1, wherein the current portion is a current video sequence, and wherein including the probability update indicator in the output bitstream includes including the probability update indicator in a header for the current video sequence.

5. The method of claim 1, wherein the current portion is a current group of pictures, and wherein including the probability update indicator in the output bitstream includes including the probability update indicator in a header for the current group of pictures.

6. The method of claim 1, wherein the current portion is a current frame, and wherein including the probability update indicator in the output bitstream includes including the probability update indicator in a header for the current frame.

7. The method of claim 1, wherein the current portion is a current tile, and wherein including the probability update indicator in the output bitstream includes including the probability update indicator in a header for the current tile.

8. The method of claim 1, wherein the current portion is a current block, and wherein including the probability update indicator in the output bitstream includes including the probability update indicator in a header for the current block.

9. A method comprising:
   generating, by a processor, decoded image data by decoding encoded image data using adjustable per-symbol entropy coding probability updating, wherein decoding the encoded image data using adjustable per-symbol entropy coding probability updating includes:
      identifying a current portion of the decoded video stream;
      identifying a probability update indicator for the current portion, the probability update indicator indicating whether per-symbol entropy coding probability updating is enabled for the current portion;
      identifying current entropy coding probabilities for decoding the current portion;
      identifying a current entropy coded representation of a current symbol from the current portion;
      generating the current symbol by entropy decoding the current entropy coded representation of the current symbol based on the current entropy coding probabilities;
      in response to generating the current symbol:
         in response to a determination that the probability update indicator indicates that per-symbol entropy coding probability updating is enabled for the current portion:
            generating updated entropy coding probabilities based on the current symbol and the current entropy coding probabilities; and
            identifying the updated entropy coding probabilities as the current entropy coding probabilities;
         in response to a determination that the probability update indicator indicates that per-symbol entropy coding probability updating is disabled for the current portion, omitting generating updated entropy coding probabilities;
         generating a decoded current portion using the current symbol; and
         including the decoded current portion in the decoded image data; and
   outputting the decoded image data.

10. The method of claim 9, wherein the probability update indicator is a binary flag.

11. The method of claim 9, wherein identifying the probability update indicator for the current portion includes:
   in response to a determination that the encoded image data includes the probability update indicator for the current portion, reading the probability update indicator from the encoded image data; and
   in response to a determination that the encoded image data omits the probability update indicator for the current portion, using a previously identified probability update indicator as the probability update indicator for the current portion.

12. The method of claim 9, wherein identifying the probability update indicator for the current portion includes reading the probability update indicator from a header for the current portion.

13. The method of claim 9, wherein:
   the current portion is a current video sequence; and
   identifying the probability update indicator for the current portion includes reading the probability update indicator from a header for the current video sequence.

14. The method of claim 9, wherein:
   the current portion is a current group of pictures; and
   identifying the probability update indicator for the current portion includes reading the probability update indicator from a header for the current group of pictures.

15. The method of claim 9, wherein:
   the current portion is a current frame; and
   identifying the probability update indicator for the current portion includes reading the probability update indicator from a header for the current frame.

16. The method of claim 9, wherein:
   the current portion is a current tile; and
   identifying the probability update indicator for the current portion includes reading the probability update indicator from a header for the current tile.

17. The method of claim 9, wherein:
   the current portion is a current block; and
   identifying the probability update indicator for the current portion includes reading the probability update indicator from a header for the current block.

18. An apparatus comprising:
   a processor configured to generate decoded image data by decoding encoded image data using adjustable per-symbol entropy coding probability updating, wherein decoding the encoded image data using adjustable per-symbol entropy coding probability updating includes:
      identifying a current portion of the decoded video stream;
      identifying a probability update indicator for the current portion, the probability update indicator indicating whether per-symbol entropy coding probability updating is enabled for the current portion;
      identifying current entropy coding probabilities for decoding the current portion;
      identifying a current entropy coded representation of a current symbol from the current portion;
      generating the current symbol by entropy decoding the current entropy coded representation of the current symbol based on the current entropy coding probabilities;
      in response to generating the current symbol:
         in response to a determination that the probability update indicator indicates that per-symbol entropy coding probability updating is enabled for the current portion:
            generating updated entropy coding probabilities based on the current symbol and the current entropy coding probabilities; and
            identifying the updated entropy coding probabilities as the current entropy coding probabilities;
         in response to a determination that the probability update indicator indicates that per-symbol entropy coding probability updating is disabled for the current portion, omitting generating updated entropy coding probabilities;
         generating a decoded current portion using the current symbol; and
         including the decoded current portion in the decoded image data; and
      outputting the decoded image data.

19. The apparatus of claim 18, wherein the probability update indicator is a binary flag.

20. The apparatus of claim 18, wherein identifying the probability update indicator for the current portion includes:
   in response to a determination that the encoded image data includes the probability update indicator for the current portion, reading the probability update indicator from the encoded image data; and in response to a determination that the encoded image data omits the probability update indicator for the current portion, using a previously identified probability update indicator as the probability update indicator for the current portion.

\* \* \* \* \*